US012765538B2

(12) United States Patent
Wang

(10) Patent No.: US 12,765,538 B2
(45) Date of Patent: Oct. 20, 2026

(54) TELESCOPIC INSECT-AND-FLY REPELLENT DEVICE

(71) Applicant: Shenzhen Maichen Suchuang Technology Co., Ltd., Shenzhen (CN)

(72) Inventor: Haichao Wang, Shenzhen (CN)

(73) Assignee: Shenzhen Maichen Suchuang Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/027,722

(22) Filed: Jan. 17, 2025

(65) Prior Publication Data

US 2025/0160316 A1 May 22, 2025

Related U.S. Application Data

(63) Continuation-in-part of application No. 18/204,946, filed on Jun. 2, 2023, now abandoned.

(51) Int. Cl.
*A01M 29/06* (2011.01)

(52) U.S. Cl.
CPC .................................. *A01M 29/06* (2013.01)

(58) Field of Classification Search
CPC . A01M 29/06; A01M 2200/012; F04D 25/08; F04D 25/082; F04D 25/084; F04D 25/086; F04D 25/088; A63H 1/00; A63H 33/40
USPC ............... 119/712; 446/69, 236, 487; 43/111
See application file for complete search history.

(56) References Cited

U.S. PATENT DOCUMENTS

| | | | | |
|---|---|---|---|---|
| D669,940 | S * | 10/2012 | Berkshire | D21/471 |
| 11,846,299 | B2 * | 12/2023 | Noble | F04D 29/34 |
| 2011/0248040 | A1 | 10/2011 | McGregor | |
| 2020/0093119 | A1 | 3/2020 | Peltekian | |
| 2020/0240578 | A1 * | 7/2020 | Chen | F16M 11/2021 |

FOREIGN PATENT DOCUMENTS

| | | | | | |
|---|---|---|---|---|---|
| AU | 2011100135 | A4 | | 3/2011 | |
| CN | 112567138 | A | * | 3/2021 | F04D 29/644 |
| CN | 114467906 | A | | 5/2022 | |
| DE | 202020106129 | U1 | * | 11/2020 | A01M 29/12 |
| EP | 4176716 | A1 | * | 5/2023 | A01M 1/023 |
| KR | 200490387 | Y1 | * | 11/2019 | H03G 7/002 |
| WO | 2020151763 | A1 | | 7/2020 | |

OTHER PUBLICATIONS

Mommy Che Dugan, "Fly Fans for Table . . .", May 23, 2023, YouTube; https://www.youtube.com/watch?v=r8tpJM5UWxl (Year: 2023).*

* cited by examiner

*Primary Examiner* — Kimberly S Berona
*Assistant Examiner* — Erica Michelle Huebner
(74) *Attorney, Agent, or Firm* — Westbridge IP LLC

(57) ABSTRACT

A telescopic insect-and-fly repellent device includes a plurality of telescopic sleeves. A fan assembly is disposed on the sleeve at the top, and the sleeves slide through a sliding rail mechanism; during usage, the sleeves are limited by a locking device, and can be contracted only by pressing the locking device; and this configuration can ensure reliable connection in an unfolded state, and prevent the insect-and-fly repellent device from contracting due to misoperation, which may otherwise affect normal use.

16 Claims, 12 Drawing Sheets

TELESCOPIC INSECT-AND-FLY REPELLENT DEVICE

CROSS-REFERENCE TO RELATED APPLICATIONS

This application is a continuation-in-part of U.S. patent application Ser. No. 18/204,946, filed on Jun. 2, 2023, the content of which is incorporated herein by reference in its entirety.

TECHNICAL FIELD

The present disclosure relates to the technical field of insect repellent, particularly to a telescopic insect-and-fly repellent device.

BACKGROUND

When the temperature is high in summer, there are more mosquitoes and flies on the dining table, fruit bowls or stalls. In order to avoid the pollution of fruits or food by mosquitoes and flies, many users drive away mosquitoes and flies by using fly-driving fans.

For example, a flying insect deterrent system and device disclosed in U.S. Patent Publication No. U.S. Pat. No. 11,622,552B2, a portable electric fly repeller disclosed in Chinese Patent Application Publication No. CN114467906A, and an insect deterrent device disclosed in Australian Patent Application Publication No. AU2011100135A3 are all integrated structures, which are non-contractible and bulky, and often need to occupy a large storage space when idle.

International Application Publication No. WO2020151763A1 discloses electrical equipment and its support base. The telescopic mechanism of this solution includes an inner sleeve and a telescopic rod which can be telescopic. The connecting end of the telescopic rod is inserted into the inner sleeve from the opening at the top end of the inner sleeve and is firmly connected with the inner sleeve, and the installation end of the telescopic rod is equipped with a useful electrical body. In this solution, at least two longitudinal arc-shaped grooves are disposed on the telescopic rod at intervals, and correspondingly, two arc-shaped protrusions are disposed on the lock ring to match with the two arc-shaped grooves. The arc-shaped grooves in this solution are disposed on the outer side of the telescopic rod, which seriously affects the appearance of the product, and there is no structure for locking the adjacent telescopic rods in this solution to prevent the telescopic rods from automatically retracting.

U.S. Patent Publication No. US20110248040A1 discloses a foldable container that is movable from a folded position having a reduced volume for storage and transportation. The foldable container has a plurality of outer wall sections, and the outer wall sections are provided with releasable locking devices. The specific structure is that the walls are provided with engageable lugs and openings. Preferably, in order to help lock and release the lugs from the openings, the outer surface edges of the lugs are set in an arc shape. Usually, the materials used for manufacturing the outer wall sections have certain elasticity, so the structure can lock the adjacent outer wall sections to a certain extent. However, after the product is used for a long time, it is likely to be unreliable due to wear.

Based on the above problems, there is a need to design a brand-new insect-and-fly repellent device, which has less storage volume, reduces the space occupied when idle, and can reliably maintain the use state, and is simple to store.

SUMMARY

The present disclosure aims to solve the technical problems that the insect-and-fly repellent device in the prior art cannot be stored and the connecting structure is unstable when being unfolded.

In order to solve the above technical problems, the present disclosure provides a telescopic insect and fly expelling device, which includes a bottom sleeve, an extension sleeve slidably disposed in the bottom sleeve, and a top sleeve slidably disposed in the extension sleeve, wherein a fan assembly is disposed on the top sleeve.

The cross-sectional areas of the bottom sleeve, the extension sleeve and the top sleeve are gradually increased from top to bottom; a slide rail structure is disposed between the bottom sleeve and the extension sleeve; a slide rail structure is disposed between the extension sleeve and the top sleeve; with the slide rail structure, the insect-and-fly repellent device is switchable between a storage state and a use state.

A top end of the extension sleeve and a top end of the bottom sleeve are both provided with first retaining rings extending towards a center; a bottom end of the top sleeve and a bottom end of the extension sleeve are both provided with second retaining rings extending outwards; during usage, the first retaining ring and the second retaining ring resist each other, and the second retaining ring is provided with a first limiting groove.

The slide rail structure includes two groups of track devices disposed on inner walls of the bottom sleeve and the extension sleeve, and the track devices are uniformly disposed on the inner walls of the bottom sleeve and the extension sleeve; each track device includes two tracks disposed in parallel; when the insect-and-fly repellent device is stretched and contracted, each track slides in the first limiting groove to prevent rotation.

A bottom of the extension sleeve and a bottom of the top sleeve are both provided with locking devices, and the locking device includes a locking block driven by an elastic member; the locking device further includes an end cover, a chute is disposed on the end cover, and the locking block slides along the chute; the locking block includes a locking part; a bottom of the top sleeve and a bottom of the extension sleeve are both provided with locking holes through which the locking part passes.

When the extension sleeve and the top sleeve are stretched to the use state, the locking part pops out along the locking hole, and the locking part abuts against the top ends of the bottom sleeve and the extension sleeve to complete the locking; when the locking part is pressed, the locking part is separated from the top ends of the bottom sleeve and the extension sleeve to push the extension sleeve and the top sleeve, so that the storage is realized.

By providing the slide rail structure, the top sleeve can slide into the extension sleeve and the extension sleeve can slide into the bottom sleeve when not in use, which can greatly save the storage space. In addition, during usage, the locking part abuts against the top ends of the bottom sleeve and the extension sleeve, and if the locking part is not pressed, the device cannot be contracted. This configuration can make the connection reliable during deployment, and prevent the insect-and-fly repellent device from contracting due to misoperation and affecting normal use.

DETAILED DESCRIPTION OF THE EMBODIMENTS

The present disclosure will be further described in detail with reference to the drawings and specific embodiments.

Figure 1:
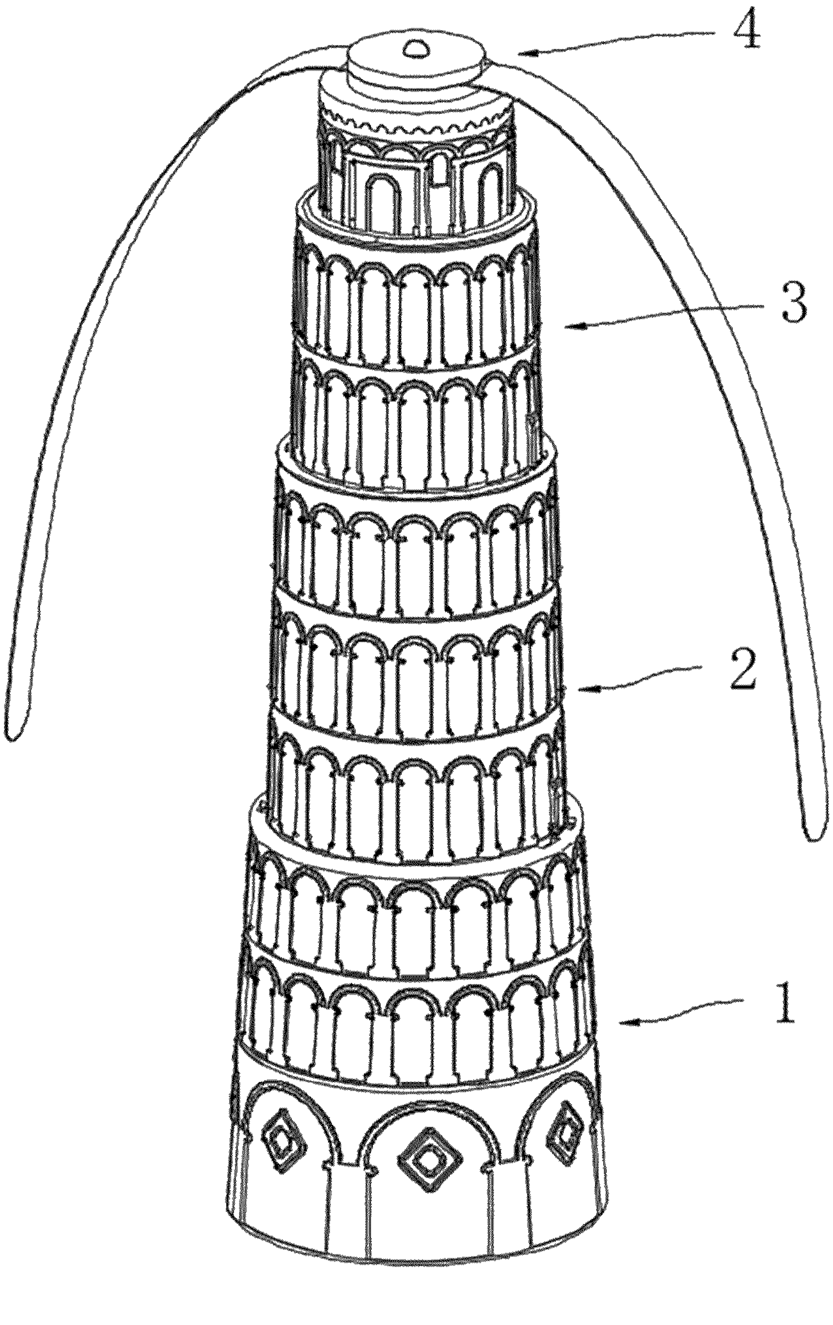
FIG. 1 is a schematic diagram of an embodiment of the present disclosure in an unfolded state.
Figure 2:
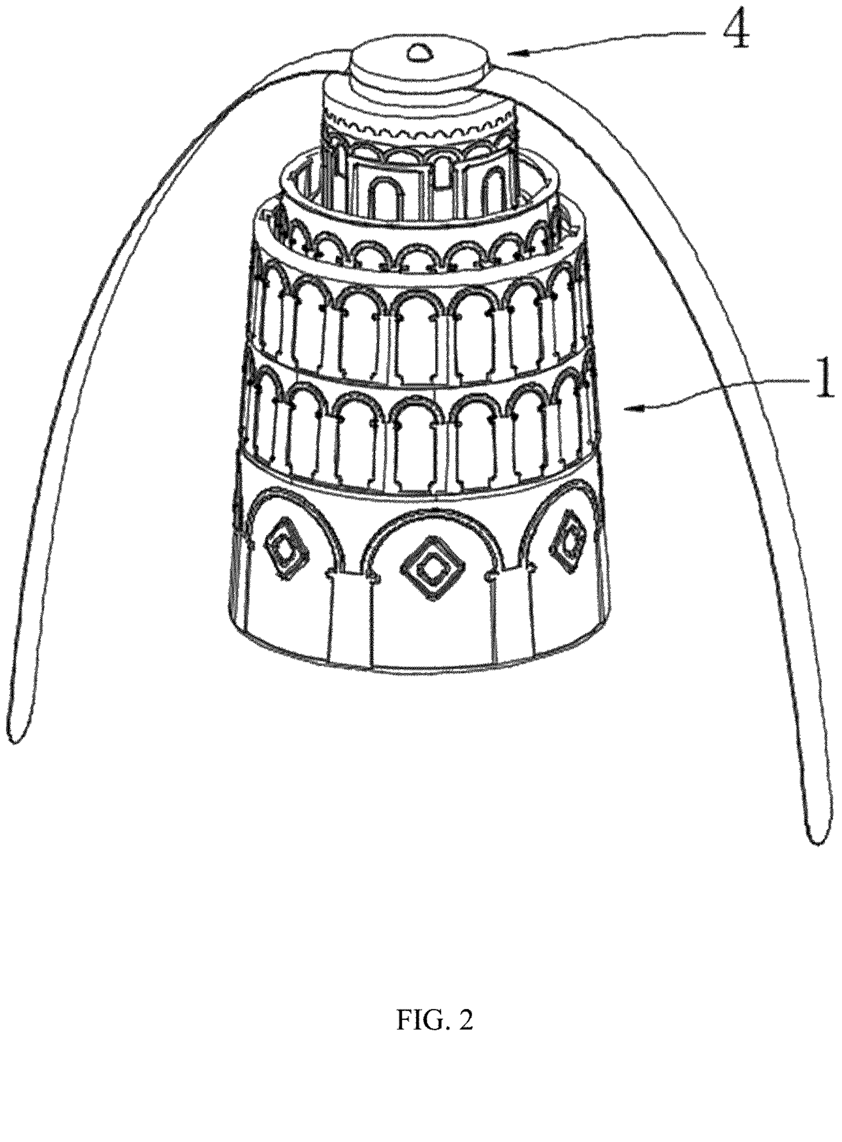
FIG. 2 is a schematic diagram of the storage state of the embodiment of the present disclosure.
Figure 3:
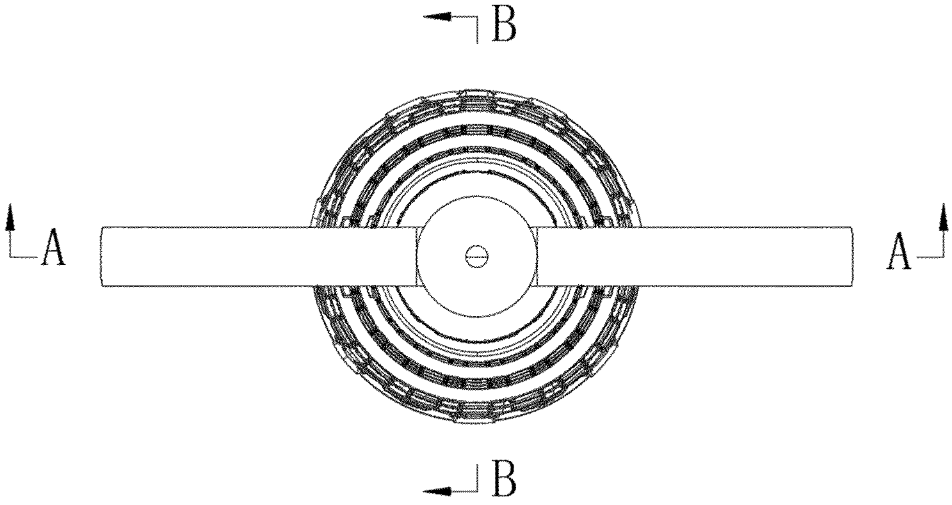
FIG. 3 is a top view of an embodiment of the present disclosure.

As shown in FIG. 1 to FIG. 2, a telescopic insect-and-fly repellent device includes a bottom sleeve 1, an extension sleeve 2 slidably disposed in the bottom sleeve 1, and a top sleeve 3 slidably disposed in the extension sleeve 2. A fan assembly 4 is disposed on the top sleeve 3.

In this embodiment, one extension sleeve 2 is provided, and the cross-sectional areas of the bottom sleeve 1, the extension sleeve 2 and the top sleeve 3 are gradually increased from top to bottom.

Figure 4:
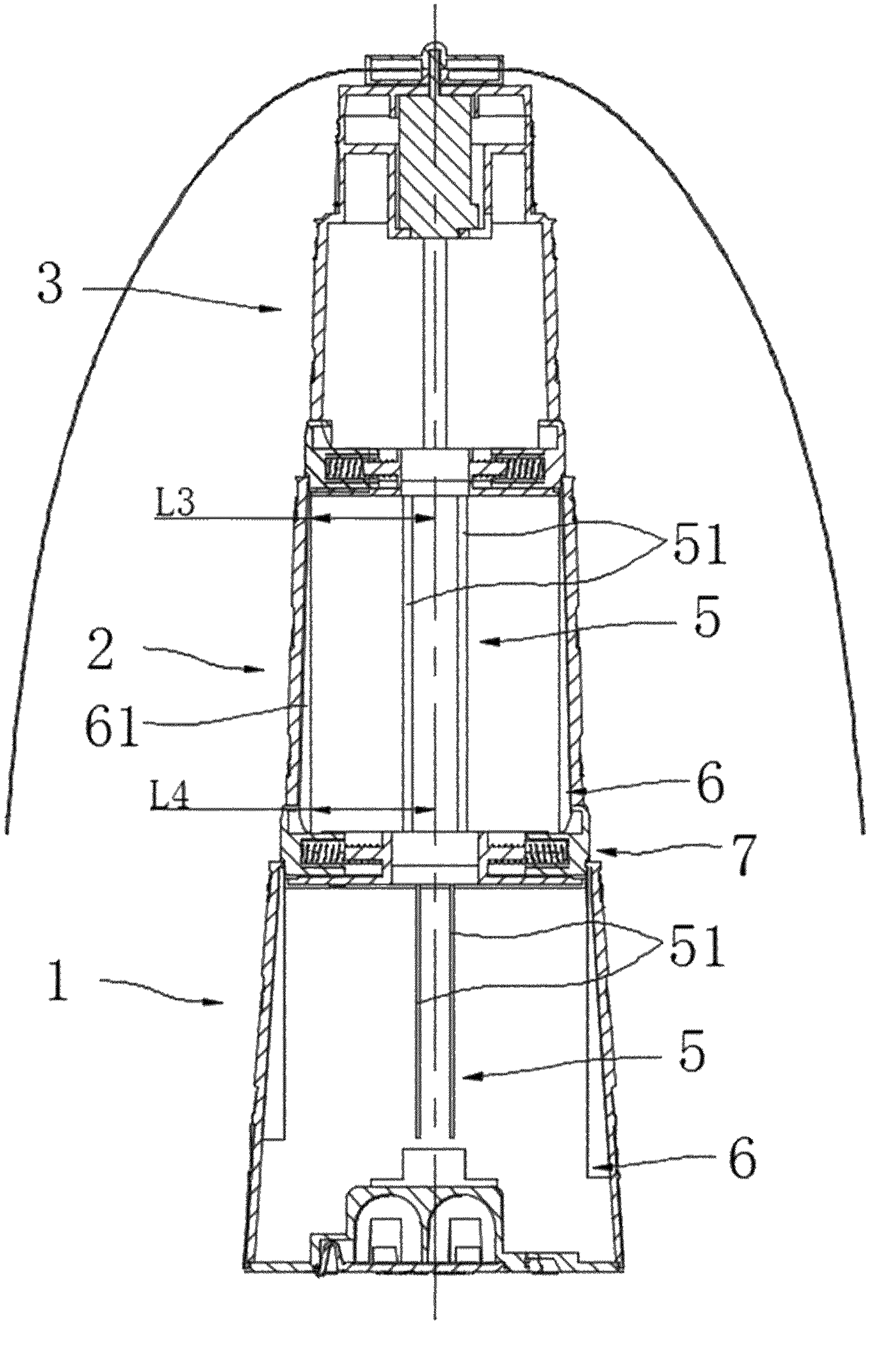
FIG. 4 is a sectional view taken along the line A-A in FIG. 3.

As shown in FIG. 4, a slide rail structure 5 is disposed between the bottom sleeve 1 and the extension sleeve 2. A slide rail structure 5 is disposed between the extension sleeve 2 and the top sleeve 3. With the slide rail structure 5, the insect-and-fly repellent device can be switched between a storage state and a use state.

Figure 5:
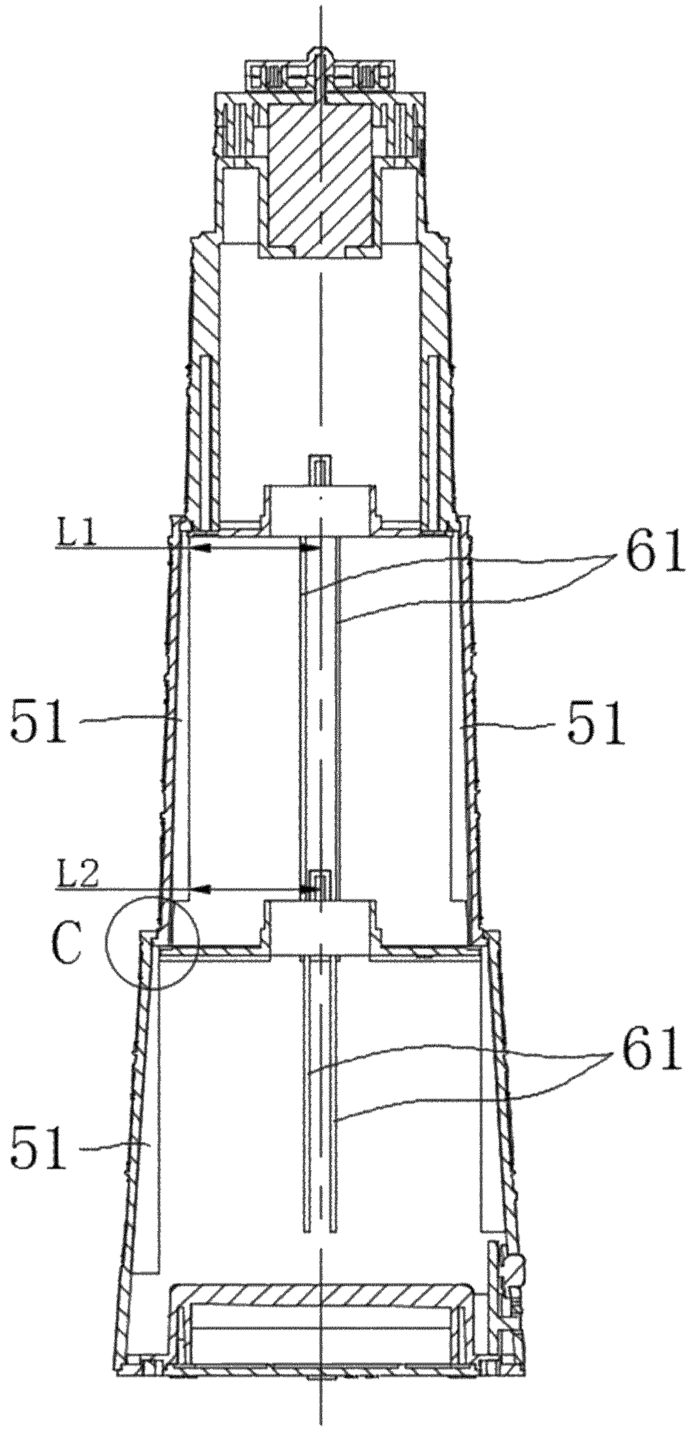
FIG. 5 is a sectional view taken along the line B-B in FIG. 3.
Figure 6:
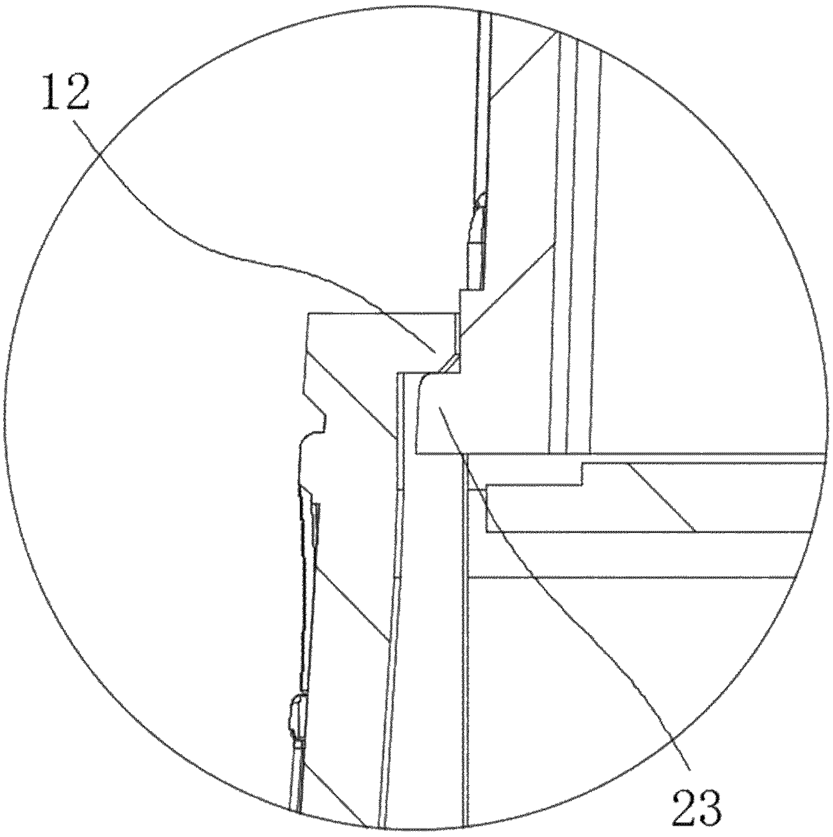
FIG. 6 is an enlarged view at c in FIG. 5.

As shown in FIGS. 5 and 6, both the top end of the extension sleeve 2 and the top end of the bottom sleeve 1 are provided with first retaining rings 12 extending inward. Both the bottom end of the top sleeve 3 and the bottom end of the extension sleeve 2 are provided with second retaining rings 23 extending outwards. During usage, the first retaining ring 12 and the second retaining ring 23 resist each other to prevent the bottom sleeve 1, the extension sleeve 2 and the top sleeve 3 from being separated.

Figure 7:
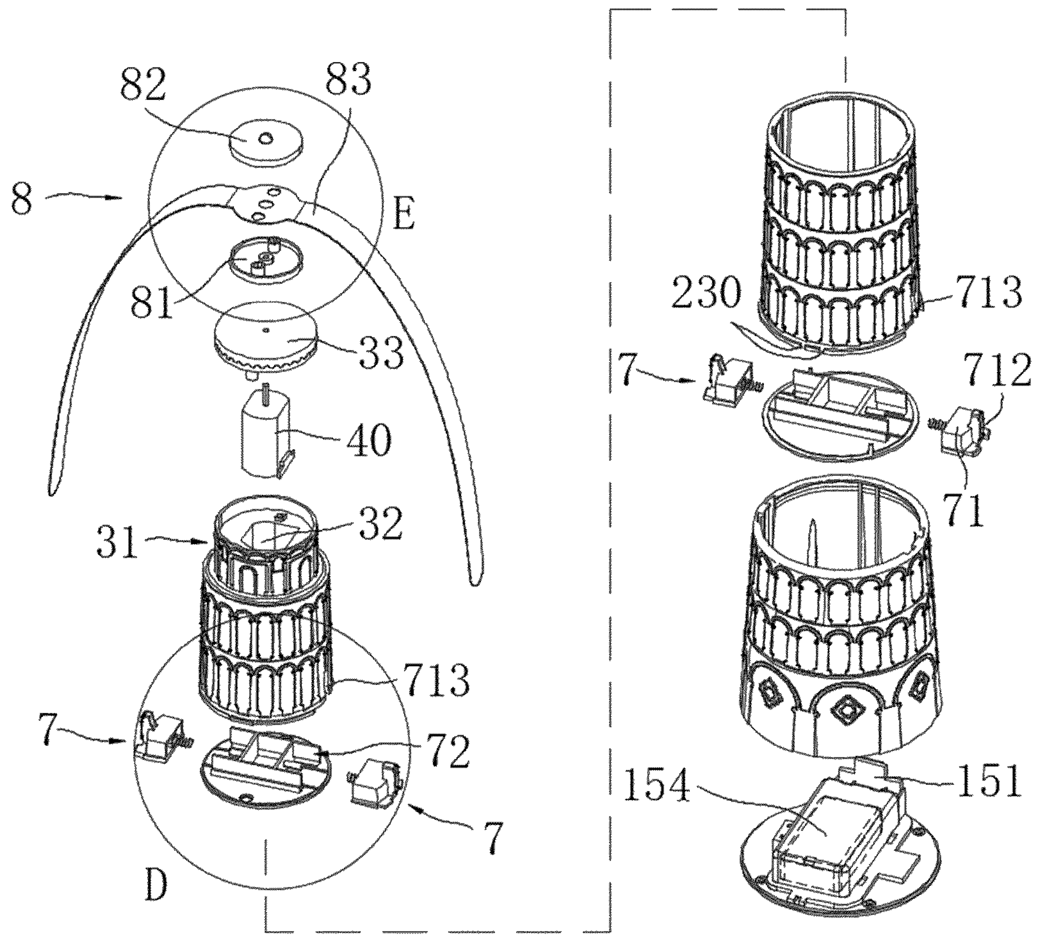
FIG. 7 is a schematic diagram of an exploded structure of an embodiment of the present disclosure.
Figure 8:
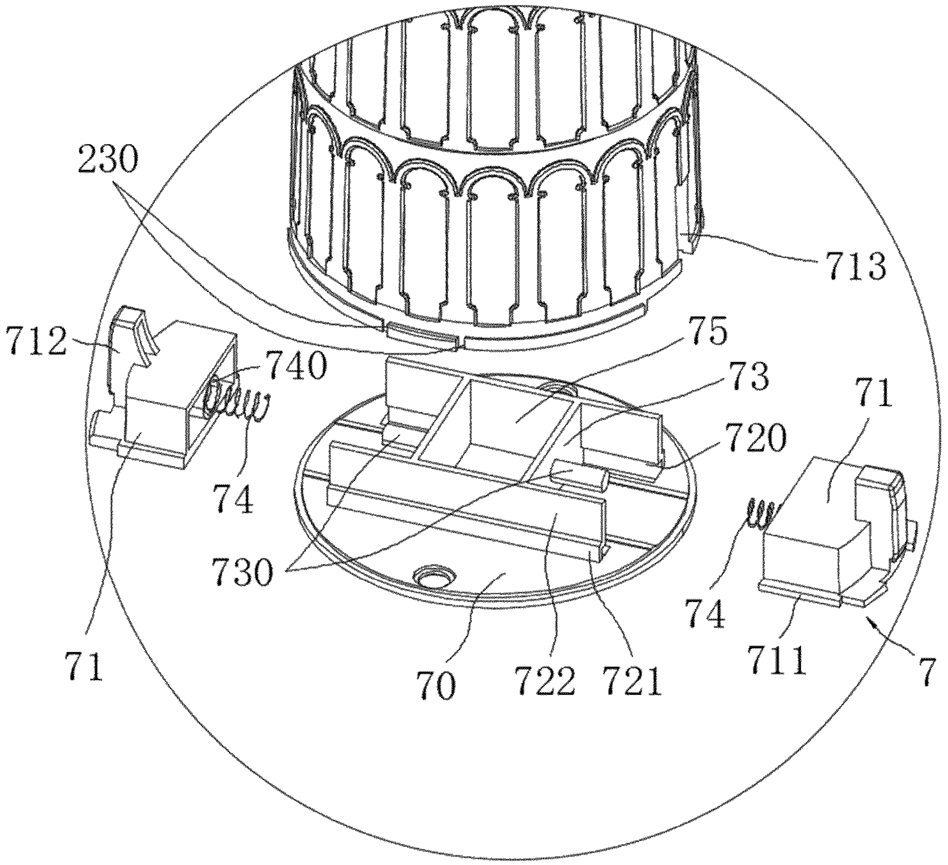
FIG. 8 is an enlarged view at d in FIG. 7.

As shown in FIGS. 7 and 8, the second retaining ring 23 is provided with a first limiting groove 230.

The slide rail structure 5 includes two groups of track devices disposed on the inner walls of the bottom sleeve 1 and the extension sleeve 2, and the track devices are uniformly disposed on the inner walls of the bottom sleeve 1 and the extension sleeve 2.

As shown in FIG. 4, FIG. 7 and FIG. 8, in this embodiment, the number of track devices on the bottom sleeve 1 and the extension sleeve 2 are both two groups, and the two groups of track devices are disposed oppositely. The track devices include two tracks 51 disposed in parallel. When the insect-and-fly repellent device is stretched and contracted, each track 51 slides in the first limiting groove 230 to prevent rotation.

As shown in FIG. 5, a distance from a top end of the track 51 to a central vertical axis of the insect-and-fly repellent device is L1, and a distance from a bottom end of the track 51 to the central vertical axis of the insect-and-fly repellent device is L2, wherein L1=L2. This configuration can ensure that the track 51 is always kept in the first limiting groove 230 to ensure the normal use of the device.

As shown in FIG. 4, the inner walls of the bottom sleeve 1 and the extension sleeve 2 are both provided with limiting devices 6, which can prevent the extension sleeve 2 and the top sleeve 3 from swinging during storage.

As shown in FIG. 4, FIG. 7 and FIG. 8, both the bottom of the extension sleeve 2 and the bottom of the top sleeve 3 are provided with locking devices 7, which include locking blocks 71 driven by elastic members.

The locking device 7 further includes an end cover 70, a chute 72 is disposed on the end cover 70, and a locking block 71 slides along the chute 72. The locking block 71 includes a locking part 712. The bottom end of the top sleeve 3 and the bottom end of the extension sleeve 2 are both provided with locking holes 713 through which the locking part 712 passes. Generally, a U-shaped groove is formed in the bottom end of the top sleeve 3 and the bottom end of the extension sleeve 2. After the end cover 70 is fixed, the end cover 70 and the U-shaped groove are enclosed to form a locking hole 713.

In this embodiment, the limiting device 6 includes two limiting strips 61 disposed in parallel, which are respectively disposed at both sides of the locking hole 713. When the locking part 712 is stored, the limiting strips 61 in the bottom sleeve 1 can prevent the extension sleeve 2 from deviating and shaking, and the limiting strips 61 in the extension sleeve 2 can prevent the top sleeve 3 from deviating and shaking.

As shown in FIG. 4, a distance from a top end of the limiting strip 61 to a central vertical axis of the insect-and-fly repellent device is L3, and a distance from a bottom end of the limiting strip 61 to the central vertical axis of the insect-and-fly repellent device is L4, wherein L3=L4.

With the resistance of the track 51 and the limiting strip 61, the bottom sleeve 1, the extension sleeve 2 and the top sleeve 3 slide smoothly and have good stability when the insect-and-fly repellent device expands and contracts.

As shown in FIGS. 7 and 8, two first side plates 721 are oppositely disposed at one side of the end cover 70, and a second side plate 722 that is offset by a certain distance to the centers of the two first side plates 721 is disposed at the top of the first side plate 721. The first side plates 721, the second side plate 722 and the end cover 70 enclose to form a chute 72.

As shown in FIG. 8, the locking block 71 further includes a limiting part 711 that can extend into the second limiting groove 720, and the limiting part 711 is inserted into the second limiting groove 720 to prevent the locking block 71 from coming out of the sliding groove 72.

In this embodiment, the elastic member is a spring 74, a spring fixing hole 740 for accommodating the spring 74 is provided in the locking block 71, and the spring 74 is in interference fit with the spring fixing hole 740.

As shown in FIG. 8, the end cover 70 is further provided with a baffle 73 for resisting elastic members, and a spring guide post 730 is provided on the baffle 73. During operation, one end of the spring 74 is inserted into the spring fixing hole 740, and the other end of the spring 74 is sleeved on the spring guide post 730.

In this embodiment, the number of baffles 73 on the end cover 70 is two, and the baffles 73 are disposed between the first side plates 721. The end cover 70 is provided with a threading hole 75 between the two baffles 73, and the threading hole 75 is used to pass through the power cord.

When the extension sleeve 2 and the top sleeve 3 are stretched to the use state, the locking part 712 pops out along the locking hole 713, and the locking part 712 abuts against the top ends of the bottom sleeve 1 and the extension sleeve 2 to complete the locking. When the locking part 712 is pressed, the locking part 712 is separated from the top ends of the bottom sleeve 1 and the extension sleeve 2 to push the extension sleeve 2 and the top sleeve 3, so that the storage can be realized.

Figure 9:
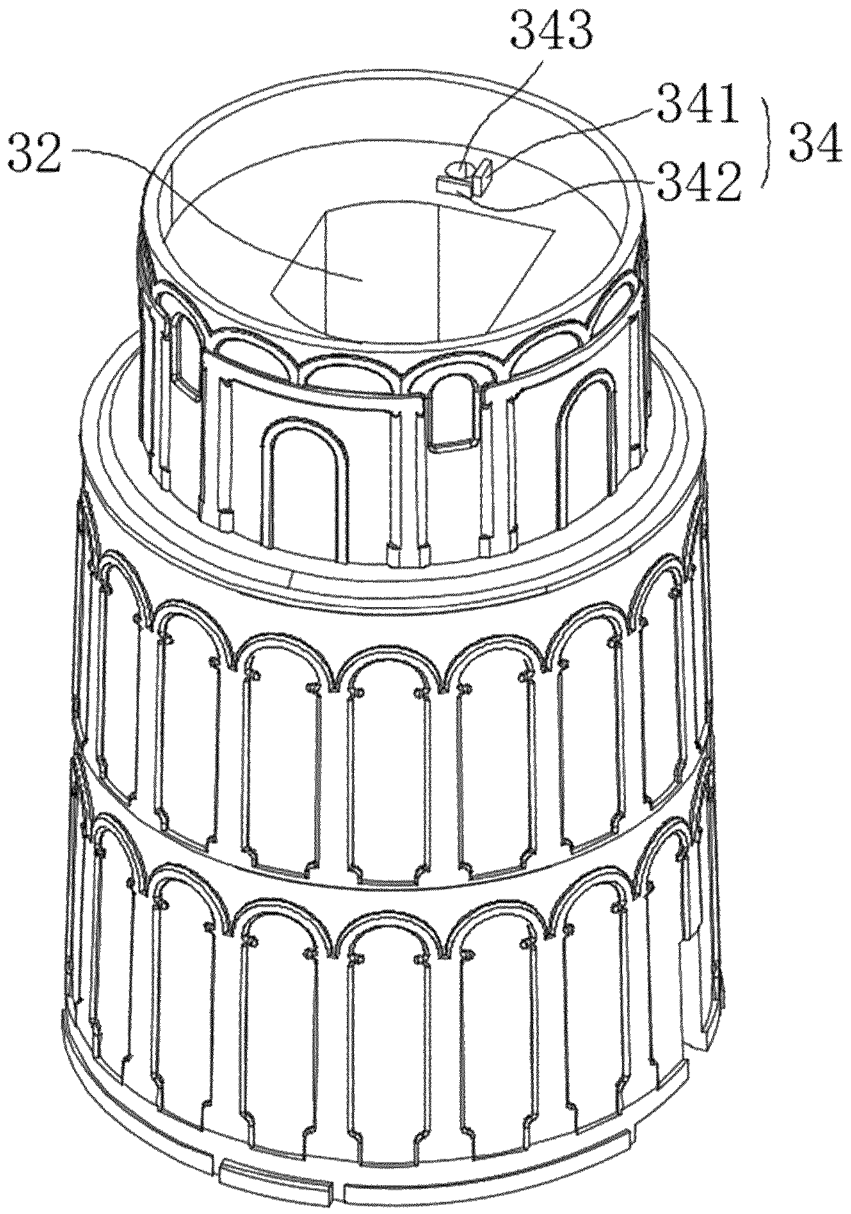
FIG. 9 is a schematic structural diagram of the top sleeve in the embodiment of the present disclosure.

As shown in FIGS. 7 and 9, the top of the top sleeve 3 is provided with a motor accommodating cavity 32 for mounting a motor.

In this embodiment, the top of the top sleeve 3 has an installation part 31, the cross-sectional area of which is smaller than the minimum cross-sectional area of the top sleeve 3, and the motor accommodating cavity 32 is disposed in the installation part 31.

The motor accommodating cavity 32 extends inward from the top of the top sleeve 3.

A motor cover plate 33 for sealing the motor accommodating cavity 32 is also provided at the mouth of the motor accommodating cavity 32.

As shown in FIG. 9, more than one group of positioning assemblies 34 are disposed on the top surface of the motor accommodating cavity 32. The positioning assembly 34 has a main positioning block 341, a guide block 342 is disposed on one side of the main positioning block 341, and the main positioning block 341 and the guide block 342 form an L-shape.

Between the main positioning block 341 and the guide block 342, there is a first through hole 343 penetrating the top surface of the motor accommodating cavity 32. A positioning hole (not shown) for positioning the motor is provided on the bottom surface of the motor accommodating cavity 32.

Figure 10:
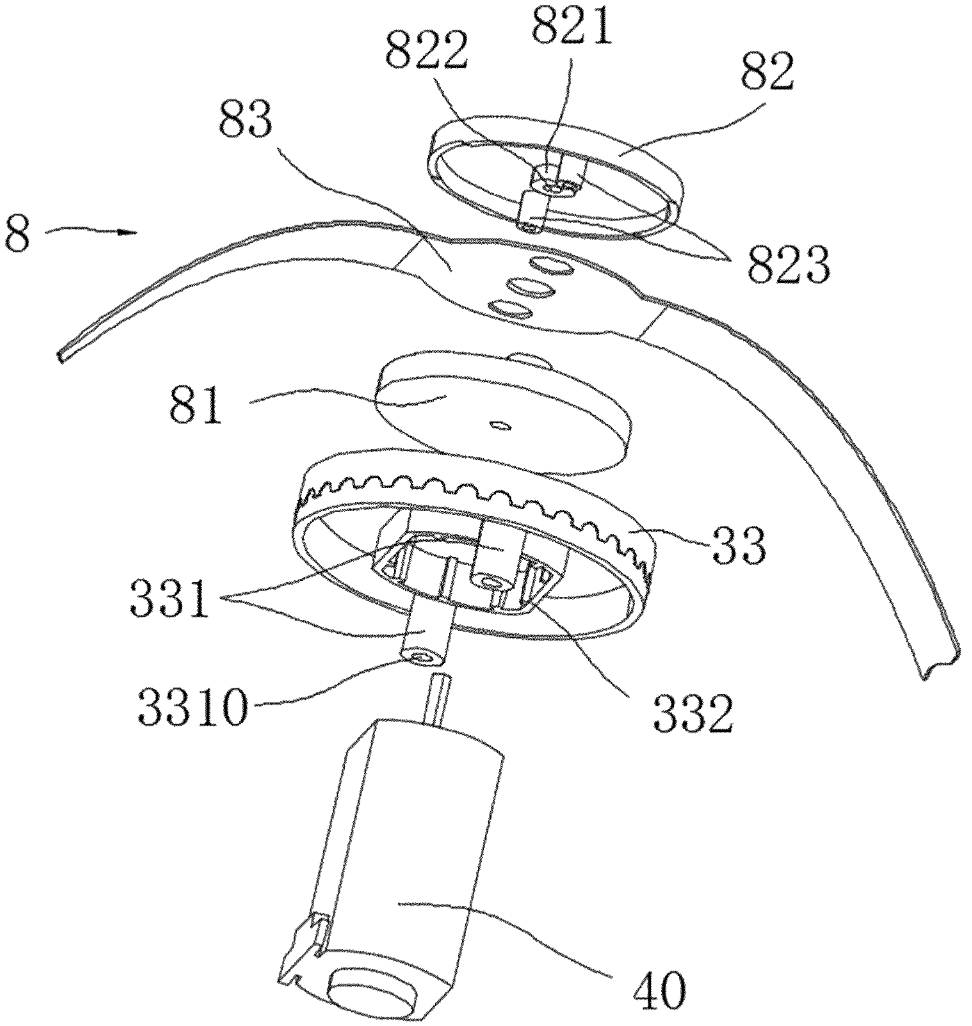
FIG. 10 is a schematic structural diagram of a fan blade assembly in an embodiment of the present disclosure.

As shown in FIG. 10, two connecting posts 331 are symmetrically disposed on one side of the motor cover plate 33, a first blind hole 3310 is formed in the connecting post 331, and a positioning projection 332 for positioning the motor is formed between the two connecting posts 331. During installation, the connecting post 331 leans against the main positioning block 341 under the guidance of the guide block 342, and the first blind hole 3310 corresponds to the first through hole 343, and a screw is screwed into the first blind hole from the inside of the top sleeve to achieve tight connection.

With the above configuration, the guide block 342 can guide and clamp the connecting column 331, which is convenient for assembly.

As shown in FIG. 10, the fan assembly 4 includes a motor 40, the rotating shaft of which passes through the motor cover 33, and the fan blade assembly 8 is disposed on the rotating shaft of the motor 40.

The fan blade assembly 8 includes a first rotating member 81 and a second rotating member 82, both of which have circular sections.

Figure 11:
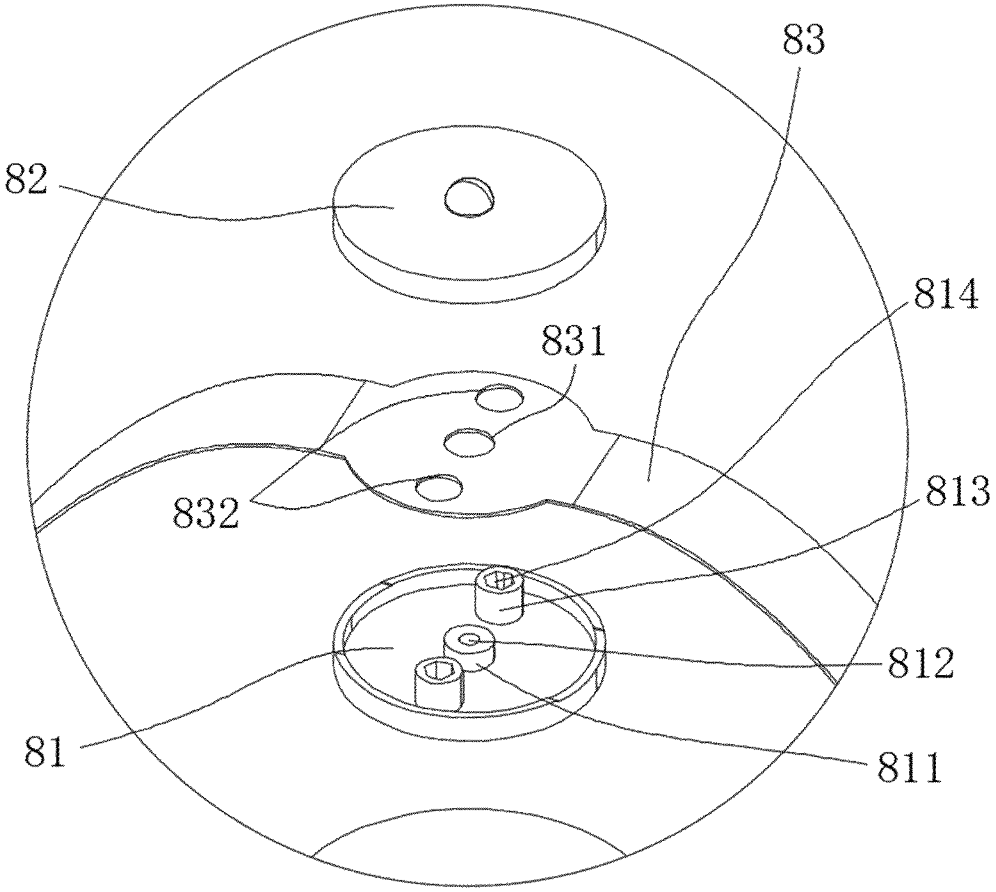
FIG. 11 is an enlarged view at e in FIG. 7.

As shown in FIG. 11, a first connecting post 811 is disposed in the center of the first rotating member 81, and a second through hole 812 is formed in the first connecting post 811. The first rotating member 81 is further provided with two first positioning posts 813, and the first positioning posts 813 are provided with second blind holes 814. In this embodiment, the outer diameter of the second through holes 812 is larger than that of the rotating shaft of the motor 40, and the cross section of the second blind holes 814 is a regular polygon.

As shown in FIG. 10, a second connecting post 821 is disposed in the center of the second rotating member 82, a third blind hole 822 is formed in the second connecting post 821, and a second positioning post 823 whfich can be inserted into the second blind hole 814 is also disposed on the second rotating member 82.

When the first rotating member 81 and the second rotating member 82 are engaged, the second positioning post 823 is inserted into the second blind hole 814, and the second positioning post 823 is in interference fit with the second blind hole 814.

The fan blade assembly 8 further includes a blade 83 made of a flexible material, and the middle part of the blade 83 has a connecting part. The connecting part is provided with a third through hole 831 that can fit with the first connecting post 811 and a fourth through hole 832 that can fit with the first positioning post 813. The above configuration can make the connection between the blade 83 and the first rotating member 81 more reliable and tight.

When the fan blade assembly 8 is installed on the rotating shaft of the motor 40, the rotating shaft of the motor 40 passes through the second through hole 812 and then is inserted into the third blind hole 822, and the rotating shaft of the motor 40 is in interference fit with the third blind hole 822.

Figure 12:
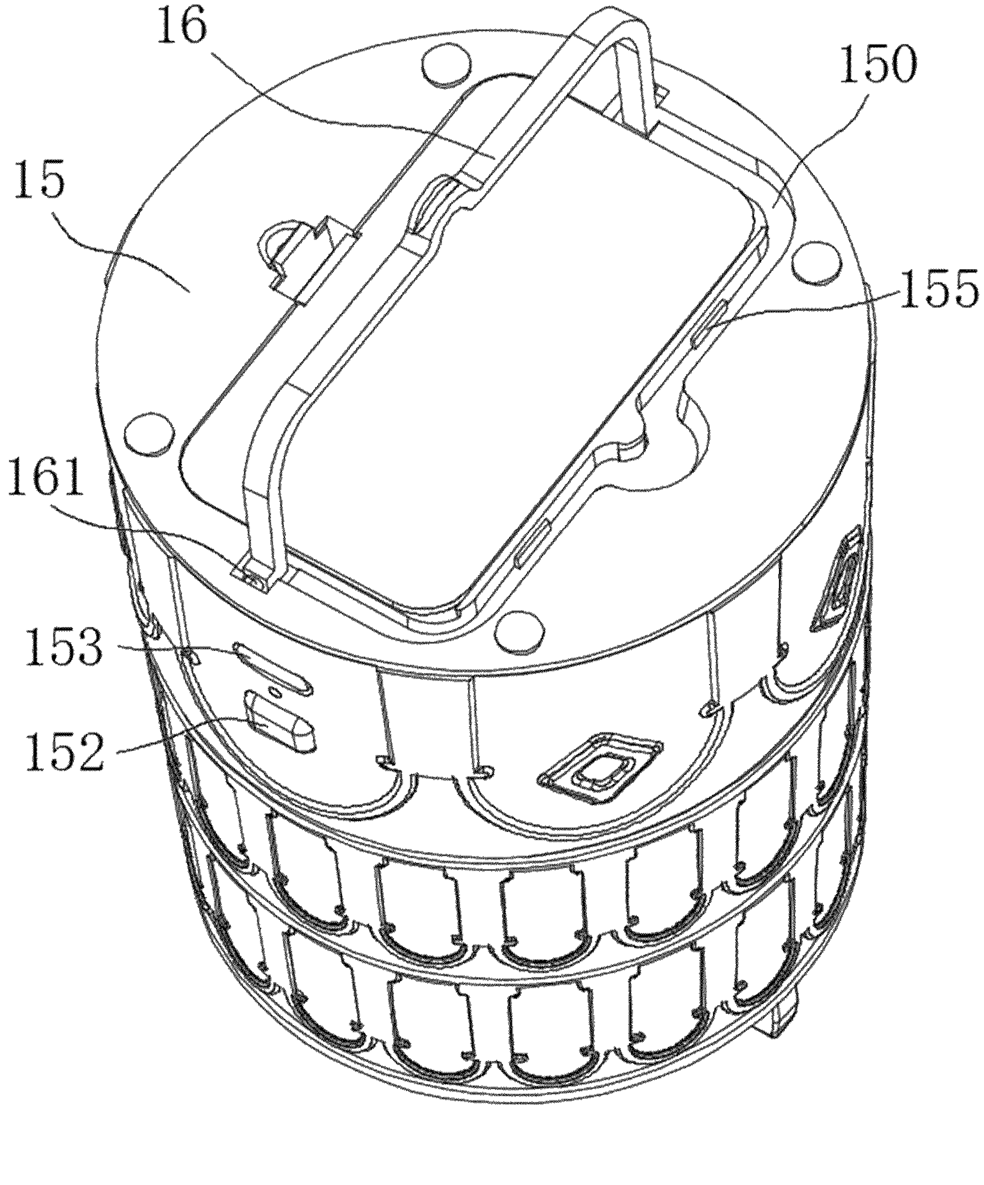
FIG. 12 is a schematic structural view from another perspective of the embodiment of the present disclosure.

As shown in FIG. 12, the bottom of the bottom sleeve 1 is provided with a bottom plate 15 for closing the bottom sleeve 1, and the bottom plate 15 is fixed to the bottom sleeve 1 by screws.

The fan assembly 4 further includes a battery 154 provided on the bottom plate 15 and a Printed Circuit Board (PCB) board 151, on which a key switch 152 and a charging connector 153 are provided.

The bottom sleeve 1 is provided with a hole through which the key switch 152 and the charging connector 153 extend.

In another embodiment, the battery is a non-rechargeable battery. In this case, there is no need to set a PCB board, and the motor, the key switch and the battery can be electrically connected.

A concave cavity 150 that is depressed inward is provided outside of the bottom plate 15, and a suspension bracket 16 is rotatably provided in the concave cavity 150.

In this embodiment, the suspension bracket 16 is U-shaped, both ends of the suspension bracket 16 are provided with hinge shafts 161 extending outward, and both ends of the concave cavity 150 are provided with hinge holes corresponding to the hinge shafts 161.

The side wall of the cavity 150 is provided with a boss 155 for fixing the suspension bracket 16. When the suspension bracket 16 is received in the concave cavity 150, the boss 155 presses the suspension bracket 16 to prevent the suspension bracket 16 from easily coming out of the concave cavity 150.

According to the above solution, by providing the slide rail structure 5, the top sleeve 3 can slide into the extension sleeve 2 and the extension sleeve 2 can slide into the bottom sleeve 1 when not in use, so that the storage space can be greatly saved; in addition, during usage, the locking part 712 abuts against the top ends of the bottom sleeve 1 and the extension sleeve 2, so that contraction cannot be realized if the locking part 712 is not pressed; and this configuration can make the connection reliable during deployment and prevent the insect-and-fly repellent device from contracting due to misoperation.

What is claimed is:

1. A telescopic insect-and-fly repellent device, comprising a bottom sleeve, an extension sleeve slidably disposed in the bottom sleeve, and a top sleeve slidably disposed in the extension sleeve, wherein a fan assembly is disposed on the top sleeve;

cross-sectional areas of the bottom sleeve, the extension sleeve and the top sleeve are gradually increased from top to bottom;

a first slide rail structure is disposed between the bottom sleeve and the extension sleeve; a second slide rail structure is disposed between the extension sleeve and the top sleeve; with the first slide rail structure and the second slide rail structure, the insect-and-fly repellent device is switchable between a storage state and a use state;

a top end of the extension sleeve and a top end of the bottom sleeve are both provided with a respective first retaining ring extending towards a center; a bottom end of the top sleeve and a bottom end of the extension sleeve are both provided with a respective second retaining ring extending outwards; during usage, each first retaining ring and a corresponding second retaining ring resist each other, and each second retaining ring is provided with a first limiting groove;

the first slide rail structure and the second slide rail structure each comprise two groups of track devices disposed on inner walls of a corresponding one of the bottom sleeve and the extension sleeve, and the track devices are uniformly disposed on the inner walls of the corresponding one of the bottom sleeve and the extension sleeve; each track device comprises two tracks disposed in parallel; when the insect-and-fly repellent device is stretched and contracted, each track slides in a corresponding first limiting groove to prevent rotation;

a bottom of the extension sleeve and a bottom of the top sleeve are both provided with a respective locking device, and each locking device comprises a locking block driven by an elastic member;

each locking device further comprises an end cover, a chute is disposed on the end cover, and the locking block slides along the chute; the locking block comprises a locking part; a bottom of the top sleeve and a bottom of the extension sleeve are both provided with a respective locking hole through which a corresponding locking part passes;

when the extension sleeve and the top sleeve are stretched to the use state, each locking part pops out along the corresponding locking hole, and each locking part abuts against the top end of a corresponding one of the bottom sleeve and the extension sleeve to complete locking of the extension sleeve and the top sleeve in the use state; when each locking part is pressed, the corresponding locking part is separated from the top end the corresponding one of the bottom sleeve and the extension sleeve to push the extension sleeve and the top sleeve, so that the storage is realized;

wherein, for each locking device, two first side plates are oppositely disposed on one side of the end cover, and a second side plate offset with respect to centers of the two first side plates is disposed at a top of the two first side plates, the two first side plates, the second side plate, and the end cover defining the chute;

wherein a second limiting groove is defined by the end cover, the two first side plates, and a bottom surface of the second side plate; and wherein the end cover is further provided with a baffle configured to resist the elastic member.

2. The telescopic insect-and-fly repellent device according to claim 1, wherein each locking block further comprises a limiting part configured to extend into the second limiting groove of the corresponding locking device, and the limiting part is capable of preventing the locking block from falling out of the corresponding chute.

3. The telescopic insect-and-fly repellent device according to claim 1, wherein each elastic member is a spring, a spring fixing hole for accommodating the spring is disposed in the corresponding locking block, and the spring is in interference fit with the spring fixing hole; and the corresponding baffle is provided with a spring guide post; when in operation, one end of the spring is inserted into the spring fixing hole, and the other end of the spring is sleeved on the spring guide post.

4. The telescopic insect-and-fly repellent device according to claim 1, wherein each end cover is provided with two baffles including the baffle, the two baffles are disposed between the two first side plates, and a threading hole is disposed on the end cover between the two baffles.

5. The telescopic insect-and-fly repellent device according to claim 1, wherein each of the inner walls of the bottom sleeve and the extension sleeve is provided with a respective limiting device configured to prevent the extension sleeve and the top sleeve from swinging during storage; and each limiting device comprises a pair of limiting strips arranged in parallel on opposite sides of a corresponding locking hole, and a corresponding locking part slides between the pair of limiting strips during storage.

6. The telescopic insect-and-fly repellent device according to claim 5, wherein a distance from a top end of each limiting strip to a central vertical axis of the insect-and-fly repellent device is L3, and a distance from a bottom end of each limiting strip to the central vertical axis of the insect-and-fly repellent device is L4, wherein L3=L4.

7. The telescopic insect-and-fly repellent device according to claim 1, wherein a distance from a top end of each track to a central vertical axis of the insect-and-fly repellent device is L1, and a distance from a bottom end of each track to the central vertical axis of the insect-and-fly repellent device is L2, wherein L1=L2.

8. The telescopic insect-and-fly repellent device according to claim 1, wherein the top of the top sleeve is provided with a motor accommodating cavity; the motor accommodating cavity extends from the top of the top sleeve to the inside, and a mouth of the motor accommodating cavity is further provided with a motor cover plate; and the fan assembly comprises a motor, a rotating shaft of the motor penetrates through the motor cover plate, and a fan blade assembly is disposed on the rotating shaft of the motor.

9. The telescopic insect-and-fly repellent device according to claim 8, wherein an installation part is provided at a top of the top sleeve, a cross-sectional area of the installation part being smaller than a minimum cross-sectional area of a remaining portion of the top sleeve below the installation part, and the motor accommodating cavity is disposed in the installation part.

10. The telescopic insect-and-fly repellent device according to claim 8, wherein a plurality of positioning assemblies is disposed on a top surface of the motor accommodating cavity, and each positioning assembly is provided with a main positioning block; one side of the main positioning block is provided with a guide block, and the main positioning block and the guide block form an L shape; and a first through hole penetrating the top surface of the motor accommodating cavity is disposed between the main positioning block and the guide block; a positioning hole for positioning the motor is disposed on a bottom surface of the motor accommodating cavity; and two connecting posts are symmetrically disposed on one side of the motor cover plate, a respective first blind hole is formed in each connecting post, and a positioning protrusion for positioning the motor is disposed between the two connecting posts; when installed, each connecting post leans against the main positioning block of a corresponding one of the positioning assemblies under guidance of the guide block of the corresponding one of the positioning assemblies; each first blind hole corresponds to a corresponding first through hole, and a screw is screwed into each first blind hole from the inside of the top sleeve to achieve tight connection.

11. The telescopic insect-and-fly repellent device according to claim 8, wherein the fan blade assembly comprises a first rotating member and a second rotating member;

a first connecting post is disposed in the center of the first rotating member, and a second through hole is formed in the first connecting post; the first rotating member is further provided with two first positioning posts, and each first positioning post is provided with a second blind hole;

a second connecting post is disposed in the center of the second rotating member, a third blind hole is provided on the second connecting post, and a second positioning post configured to be inserted into a corresponding second blind hole is further disposed on the second rotating member; and when the first rotating member and the second rotating member are engaged, the second positioning post is inserted into the corresponding second blind hole, and the second positioning post is in interference fit with the corresponding second blind hole.

12. The telescopic insect-and-fly repellent device according to claim 11, wherein the fan blade assembly further comprises a blade made of a flexible material, a middle part of the blade is provided with a connecting part, and the connecting part is provided with a third through hole configured to fit with the first connecting post and a fourth through hole configured to fit with one of the two first positioning posts.

13. The telescopic insect-and-fly repellent device according to claim 1, wherein a bottom plate for sealing the bottom sleeve is disposed at the bottom of the bottom sleeve;

the fan assembly further comprises a battery disposed on the bottom plate and a Printed Circuit Board (PCB) board, and the PCB board is provided with a key switch and a charging connector; and the bottom sleeve is provided with a hole through which the key switch and the charging connector extend.

14. The telescopic insect-and-fly repellent device according to claim 13, wherein a concave cavity depressed inward is disposed on the outer side of the bottom plate and a suspension bracket is rotatably disposed in the concave cavity.

15. The telescopic insect-and-fly repellent device according to claim 14, wherein the suspension bracket is U-shaped, both ends of the suspension bracket are provided with hinge shafts extending outwards, and both ends of the concave cavity are provided with hinge holes corresponding to the hinge shafts.

16. The telescopic insect-and-fly repellent device according to claim 1, wherein a bottom plate for sealing the bottom sleeve is disposed at the bottom of the bottom sleeve, and the fan assembly further comprises a non-rechargeable battery disposed on the bottom plate, and a key switch is disposed on the bottom sleeve.

* * * * *